United States Patent [19]

Gotou et al.

[11] Patent Number: 4,807,126
[45] Date of Patent: Feb. 21, 1989

[54] METHOD FOR CONVERTING A SOURCE PROGRAM HAVING A LOOP INCLUDING A CONTROL STATEMENT INTO AN OBJECT PROGRAM

[75] Inventors: Shizuo Gotou, Hachioji; Yasusi Kanada; Kyoko Iwasawa, both of Tokyo, all of Japan

[73] Assignee: Hitachi, Ltd., Tokyo, Japan

[21] Appl. No.: 12,991

[22] Filed: Feb. 10, 1987

[30] Foreign Application Priority Data

Mar. 3, 1986 [JP] Japan .................................. 61-43958

[51] Int. Cl.⁴ ............................................. G06F 1/00
[52] U.S. Cl. ................................................. 364/300
[58] Field of Search ....................... 364/200, 300, 900

[56] References Cited

U.S. PATENT DOCUMENTS 4,398,249  8/1983  Pardo et al. .......................... 364/300

OTHER PUBLICATIONS

Hitac S-810 Fortran, Vo S3 Fort 77/HAP, Aoyama et al., pp. 23-27.
Umetani et al., A Vectorization Algorithm for Control Statements, Journal of Information Processing, vol. 7, No. 3, 1984, pp. 170-174.

*Primary Examiner*—Raulfe B. Zache
*Attorney, Agent, or Firm*—Antonelli, Terry & Wands

[57] ABSTRACT

A method for converting a source program having a loop including a control statement into an object program including the steps of detecting from the statements of a first loop of a source program a control statement (an inductive control statement) having a control expression; detecting based on the control expression a turning form indicating whether a change of a turning number representing a loop iteration count indicates changes from values for a successful branch to values for an unsuccessful branch or vice versa and a turning point type indicating whether the turning number is an initial iteration count, a final iteration count, or an intermediate iteration count of the first loop; generating a string of statements having a loop not including the control statement and generating an execution result identical to an execution result of the first loop based on the first loop, the turning number, the turning form and the turning point type detected on the control statement; and converting the generated string of statements into an object code.

3 Claims, 9 Drawing Sheets

SORT VALUE 314-ij

| CLASSIFI-CATION | SORT VALUE |
|---|---|
| STARTING POINT | -2 |
| ENDING POINT | -1 |
| MIDDLE POINT | ITERATION COUNT FOR WHICH THE JUDGEMENT OF THE CONDITION IS FIRST TURNED |

FIG. 7

CONTROL EXPRESSION TYPE 315-ij

| BIT | CONTROL EXPRESSION TYPE |
|---|---|
| 0 | PERMANENTLY TRUE CONTROL EXPRESSION |
| 1 | PERMANENTLY FALSE CONTROL EXPRESSION |
| 2 | CONTROL EXPRESSION FROM FALSE TO TRUE FOR THE CONTROL TURNING ITERATION COUNT |
| 3 | CONTROL EXPRESSION FROM TRUE TO FALSE FOR THE CONTROL TURNING ITERATION COUNT |
| 4 | CONTROL EXPRESSION REQUIRING EQ/NE EXPANSION |
| 5 | EXPANSION OBJECT CONTROL EXPRESSION |

FIG. 8

710:
```
     DO 10  I = 1, N
        <S1>
⑪    IF (I.EQ.10) THEN
        <S2>
        ELSE
        <S3>
        ENDIF
        <S4>
10   CONTINUE
```

712:
```
     IF (N.LT.1) GO TO 20

N' = MIN (N, 9)

METHOD FOR CONVERTING A SOURCE PROGRAM HAVING A LOOP INCLUDING A CONTROL STATEMENT INTO AN OBJECT PROGRAM

BACKGROUND OF THE INVENTION

The present invention relates to a method for converting a source program having a loop including a control statement and a plurality of statements to be repetitiously executed into an object program.

Source programs include so-called loops in many cases, each loop containing a plurality of statements to be repetitiously executed. Since the loop is subjected to an iterative execution, most of the time required for an execution of an object program is allocated to an object program generated corresponding to the loop. Among the code optimization techniques heretofore developed to reduce the execution time of an object program, most of these techniques are implemented by paying attention to the loop.

The "Supercomputer HITAC S-810 FORTRAN COMPILER, VO S3 FORT 77/HAP", Hitachi Hyoron, Vol. 65, No. 8, pp. 551-555, (1983) or "A Vectorization Algorithm for Control Statement", Journal of Information Processing, Vol. 7, No. 3, pp. 170-174, (1984) describes a method for converting the loop structure in which two kinds of statements, i.e. the loop invariant control statement (for which a result is predetermined independently of the iteration of the loop) and the loop starting-point control statement (for which the judgment of the initial execution of the loop is reversed with respect to that of the subsequent execution of the loop) from the control statements in a loop, thereby obtaining the same results for the loops before and after the conversion. A loop expansion method applied to a case of a loop starting-point control statement will be described with reference to FIG. 2.

Figure 2:
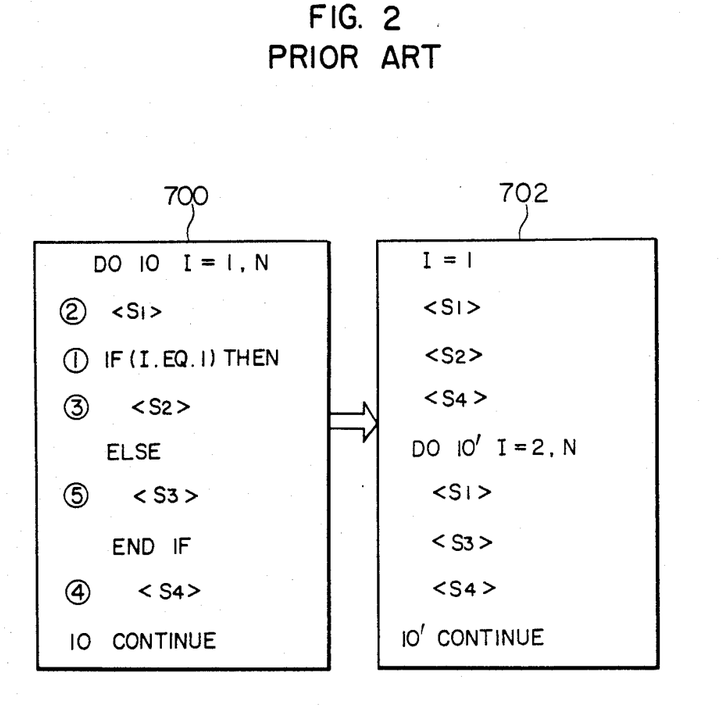
FIG. 2 is a schematic diagram for explaining an inductive control expanding part of the prior art.

In FIG. 2, reference numeral 700 denotes an example of a FORTRAN program including the starting-point control statement, which is indicated by ① Examining the characteristic of the condition IF (I. EQ. 1) in the control statement ①, the variable I is used to control the loop iteration count, namely, the condition is satisfied at the starting point (I=1) of the loop and the condition is not satisfied at other iterations.

If the portions ②, ③, and ④ to be initially (I=1) executed in the iteration of the loop are moved to locations outside the loop so as to achieve the loop iteration beginning from the second execution (I=2) the control statement in the loop becomes to be permanently false, which enables to unnecessitate the control statement and hence to remove the control statement ①, the executable statement ⑤ when the condition is satisfied, the ELSE statement, and the END statement. The result of the conversion accomplished on the loop structure becomes to be as shown in a program 702 of FIG. 2.

As methods for converting the loop structure to solve the problem associated with the control statement, there have only been known the methods described in the above-mentioned paper for effecting the conversion on the two kinds of control statements (i.e. the loop starting-point control statement and the loop invariant control statement), namely, other kinds of control statements have not been discussed with respect to the loop structure conversion.

As described above, among the control statements in a loop, only the limited kinds of control statements can be processed to solve the problems associated therewith.

SUMMARY OF THE INVENTION

It is therefore an object of the present invention to expand the objects of the resolvable control statements, and more concretely, to provide an expansion method for resolving the following two kinds of control statements.

(1) A control statement to judge the last iteration of the loop (2) A control statement to judge a particular iteration during the loop iteration Another object of the present invention is to provide a method for systematically effecting the resolution of the loop starting-point control statement of the conventional technique and the two control statements described above.

To this end, according to the present invention, there is provided a method including a step for detecting from the statements of a first loop of a source program a control statement (an inductive control statement) including a control expression specifying variables constituted from a linear function $C_1 n + C_2$ of the loop iteration count n, the variables being to be judged for a branch, where $C_1$ and $C_2$ are constants, loop invariant variables, or functions thereof; a step for detecting based on the control expression a turning form indicating whether a change of a turning number representing a loop iteration count for which a value of the control expression of the detected inductive control statement and the change of the value of the control expression indicates changes from values for a successful branch to values for an unsuccessful branch or vice versa and a turning point type indicating whether the turning number is an initial iteration count, a final iteration count, or an intermediate iteration count of the first loop; a step for generating a string of statement having a loop not including the control statement and generating an execution result identical to an execution result of the first loop based on the first loop and the turning number, the turning form, and the turning point type detected on the control statement; and a step for converting the generated string of statements into an object code.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Prior to the detailed description of an embodiment, the principle of the embodiment will be described.

In this embodiment, a compiler is provided with an inductive control expanding part, which includes an inductive control detecting part, an inductive control characteristic analyzing part, an inductive control expansion object detecting part, and a loop structure converting part.

(1) The inductive control detecting part detects from the statements in a loop of a source program a control statement (inductive control statement) including a control expression specifying as a variable to be judged for a branch a variable represented as a linear function $C_1 n + C_2$ of the loop iteration count n, where $C_1$ and $C_2$ are constants, loop invariant variables or functions thereof.

(2) The inductive control characteristic analyzing part detects based on the control expression a turning form indicating whether a change of a turning number representing a loop iteration count for which a value of the control expression of the detected inductive control statement and the change of the value of the control expression indicate changes from values for a successful branch to values for an unsuccessful branch or vice versa and a turning point type indicating whether the turning number is an initial iteration count, a final iteration count, or an intermediate iteration count of the loop part.

(3) The part for determining the object of the inductive control expansion, when a plurality of inductive control statements are detected in the step (1), arranges the inductive control statements in order based on the turning point type and the turning; number of each inductive control statement.

(4) The loop structure converting part generates a string of statements generating an execution result identical to an execution result of the loop based on the loop and the turning number, the turning form, and the turning point type detected based on the condition statement(s).

Through the steps described above, a loop including an inductive control statement can be converted into a loop not including an inductive control statement.

The components of the inductive control expanding part operate on each part of a loop in a source program as follows.

(1) The inductive control detecting part examines the statements and the expressions included in the loop to detect an inductive control expression. That is, each statement is examined and is checked for an inductive control statement. If an inductive statement is detected, the control expression thereof is examined to judge whether the expression is an inductive control expression or not.

The inductive control expression here is represented as a linear function $C_1 n + C_2$ of the loop iteration count n, where the coefficients $C_1$ and $C_2$ are constants, loop invariant variables (of which values are not changed in the loop), or functions thereof.

Incidentally, the loop iteration count is not explicitly expressed as a variable in an inductive control expression in some cases. For example, in the loop of the program 700 of FIG. 2, the variable I is equal to the loop iteration count n; however, in the loop of the program 702 of FIG. 2, the variable I is different from the loop iteration count n, namely, there exists a relationship of $I = n + 1$. In general, an inductive control expression includes or does not include the loop iteration count n as an explicit variable.

The definition of an inductive control expression can be alternatively defined as follows. First, an inductive variable is defined to be a variable which is selected from the variables expressed in a loop of a source program and which has a value representable by use of a linear function $C_3 n + C_4$ of the loop iteration count n, where $C_3$ and $C_4$ are constants or loop invariant variables. The I's in the loops of the programs 700 and 702 of FIG. 2 are both inductive variables. An inductive control expression f(t) is represented as a linear function $C_5 I + C_6$ of the inductive variable I, where $C_5$ and $C_6$ are constants or loop invariant variables. Then, $$I = C_3 n + C_4 \qquad (1)$$

$$f(I) = C_5 I + C_6 = (C_5 C_3) n + (C_4 C_5 + C_6) \qquad (2)$$

result and satisfy the definition of the inductive control expression.

An inductive control expression is detected as follows.

(a) Registration of inductive variables

Among the variables included in the loop, those expressed by the expression (1) are detected and registered.

(b) Registration of inductive expressions

For each inductive variable, an expression (called an inductive expression) containing the variable as an element thereof is registered.

(c) Registration of inductive control expressions

Among the inductive expressions registered in the step (b), those represented as control expressions in a control statement are registered as inductive control expressions to an inductive control expression table.

(2) The inductive control characteristic analyzing part performs an analysis on each inductive control expression registered to the inductive control expression table to judge the type of the inductive control expression. Namely, the point (the starting, ending, or middlepoint) of the loop iteration at which the judged value of the inductive control expression is turned or inverted and the turning form of the judged value of the control expression in the neighborhood of the turning point are examined as follows.

(a) Judgment of a turning point

The inductive control expression f(I) is a linear function of the loop iteration count n.

$$f(I) = g(n) = C_7 * n + C_8 \cdot rop \cdot C_9 \qquad (3)$$

where, $C_7$, $C_8$, and $C_9$ are constants, loop invariant variables, or expressions constituted therefrom For the judgment, the relative operator of the expression is regarded as EQ (equal sign) to solve the equation $$C_7 * n + C_8 = C_9 \qquad (4)$$

From the expression (4), $$n = (C_9 - C_8)/C_7 \quad (5)$$

is obtained.

The loop iteration count n ranges from 1 to the loop number l. The characteristic of the control expression can be judged depending on the value of the solution n of the expression (5), and the type of the relative operator, and the positive/negative sign of $C_7$ value of the expression (5). An operation of judgment will be described with reference to an example of a case where the relative operator is GT (the subject is greater than the object) and the value of $C_7$ is positive.

(i) n = 1

For the first loop iteration, the expression (3) becomes false, whereas for the second and subsequent iterations, the expression (3) becomes true; consequently, the control expression is a starting-point inductive control expression.

(ii) n ≦ 1

Since the expression (3) is false for all loop iterations, the control expression is a permanently false control statement.

(iii) 1 < n < l

"False" results for the loop iterations up to the n-th iteration, and "true" results for the (n+1)-th and subsequent iterations; consequently this control expression is a middle-point inductive control expression.

(iv) n < 1

Since the expression (3) is true for all loop iterations, this control expression is a permanently true control statement.

(v) n > l

Since the expression (3) is false for all loop iterations, this control expression is a permanently false control statement.

For other relative operators and in a case where the value of $C_7$ is negative, the type of the inductive control expression can be determined by effecting the similar judgment.

(b) Examination of turning form

For the relative operators EQ (equal to) and NE (not equal to), the turning form may be different from that of the GT in some cases. Namely, the turning form is different only when the solution n of the expression (3) is 1 < n < l. For example, if the relative operator is EQ, the control expression is false from the first loop iteration to the (n−1)-th loop iteration, true only for the n-th iteration, and false for the (n+1)-th and subsequent iterations. If the relative operator is NE, the control expression is changed as true→false→true in a fashion opposite to the case of EQ. As described above, the judged result of the control expression turns two times for EQ and NE.

The inductive control characteristic analyzing part achieves the characteristic analysis and records the result in the inductive control expression table.

(3) The inductive control expansion object determining part determines the inductive control expressions selected from a plurality of inductive control expressions for the expansion and the order of expansion thereof based on the characteristic set in the step (2) above. That is, if a lot of inductive conditions are detected in the step (1), it is not advantageous to effect the loop expansion on all the conditions to resolve the inductive control statements because of a great size of an object program generated as a result. To overcome this difficulty, the inductive control expressions to be expanded must be selected. In addition, to effectively accomplish the processing of the loop structure conversion to be described later, the inductive control expressions are arranged in order. Namely, the inductive control expressions are ordered by use of the value n of the solution of the expression (3).

(a) The inductive control expression for n ≦ 1 is ordered as the first level.

(b) The inductive control expression for n ≧ l is ordered as the next level.

(c) The inductive control expressions for 1 < n < l are ordered in the ascending order of the value of n.

In order to effect the operation above, a sort value field is provided in the inductive control expression table 300. The sort values −2, −1, and n are assigned to the inductive control expressions for N ≦, n ≧ l, and 1 < n < l, respectively. The inductive control expressions can be ordered as described above by executing a sorting of these expressions in the ascending sort value order.

In an expansion of an inductive control expression, the components of the loop may be expanded up to two times the original components. Since the expressions having the same sort value are expanded at the same time (to be described later), these expressions are collectively considered as a group. Within a range in which the loop expansion is allowed, the inductive control expression as an expansion object is selected in the ascending sort value order.

(4) The loop structure converting part 44 processes for each inductive control expression selected in the step (3) to generate a loop structure which is equivalent to the original loop structure and from which the control expressions are removed. This operation is simultaneously achieved for the expressions having the same sort value.

(a) From the permanently true control expression, the control expression and the ELSE-part are removed.

(b) From the permanently false control expression, the control expression and the THEN-part are removed.

(c) For the starting-point control expression, a part to be executed at the loop starting point is generated at a position immediately before the loop and the inductive control expression and the THEN-part in the loop are erased (in a case where the expression is false at other than the loop starting point. The ELSE-part is erased if the expression is true). In addition, an incrementation value is added to the initial value of the loop control displacement.

(d) For the ending-point control expression, a part to be executed at the loop ending point is generated at a position immediately after the loop and the inductive control expression and the THEN-part (or the ELSE-part) in the loop are erased. Moreover, the incrementation value is subtracted from the final value of the loop control variable.

(e) For the middle-point control expression, two kinds of expansion forms are used. If the relative operator is other than EQ and NE, two loop structures are generated as follows.

(i) For the part from the first loop iteration to the (n−1)-th iteration, the inductive control expression and the THEN-part (or the ELSE-part) are erased.

(ii) For the part from the n-th loop iteration to the final iteration, the inductive control expression and the ELSE-part (or the THEN-part; the part other than that of the step (i)) are erased.

If the relative operator is EQ or NE, the expression is expanded into the following three parts.

(i) For the loop from the first loop iteration to the $(n-1)$-th iteration, the inductive control part and the THEN-part are erased (for EQ. The ELSE-part is erased for NE).

(ii) A part to be executed in the n-th interation.

(iii) For the loop from the $(n+1)$-th loop iteration to the final iteration, the inductive control expression and the THEN-part are erased (for EQ. The ELSE-part is erased for NE).

As described above, the inductive conditions in the loop are detected and the loop structure conversion can be accomplished to resolve the inductive conditions.

Referring now to FIGS. 1–5, an embodiment of the present invention will be described in detail.

Figure 3:
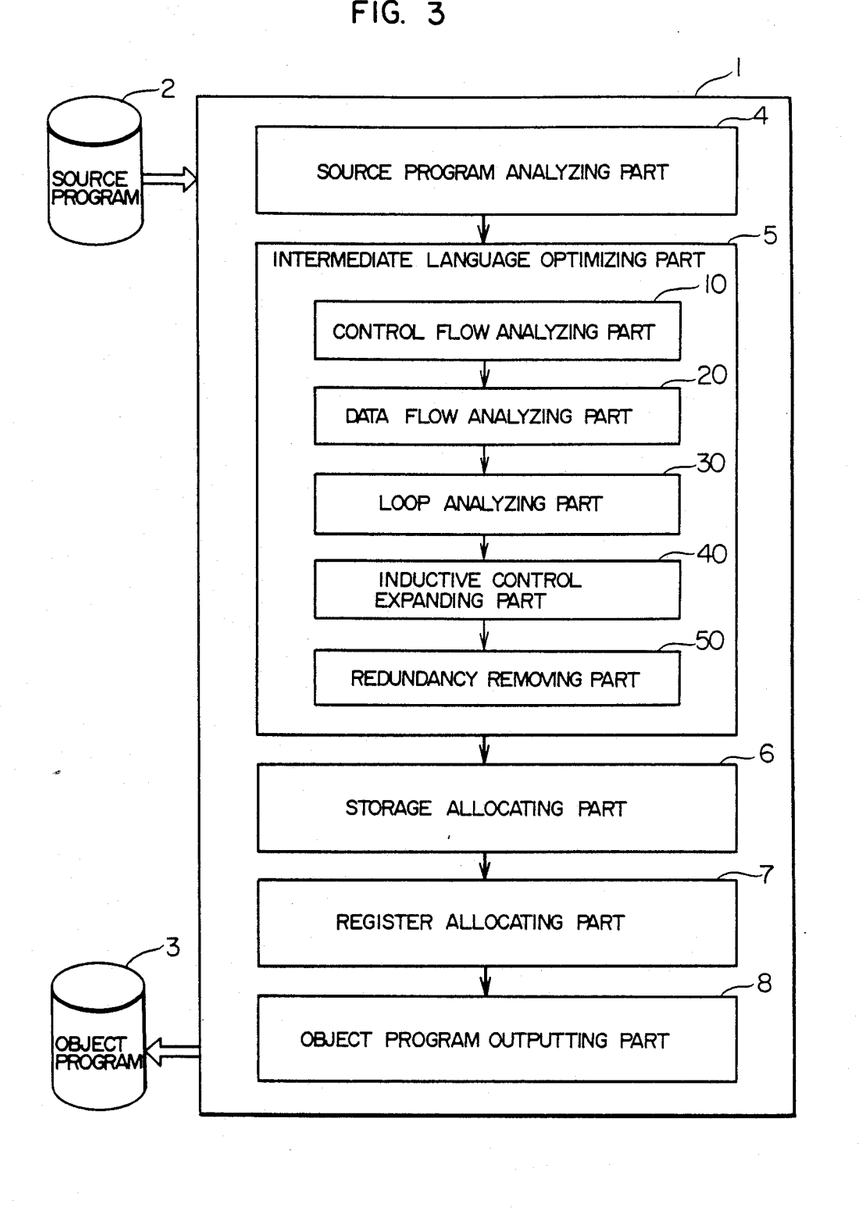
FIG. 3 is a general flowchart of a compiler program to which the present invention is applied.

FIG. 3 shows a configuration of a compiler program to which the present invention is applied.

A compiler program 1 receives a source program as an input thereto and generates an object program which runs on a digital computer or a vector computer.

The compiler program 1 operates as follows.

A source program analyzing part 4 reads a source program written in the FORTRAN from a mass-storage device 2 and translates the source program into an intermediate language expression (not shown).

An intermediate language optimizing part 5 accomplishes an analysis of the structure and data reference relationships on the intermediate language expression and converts the expression into a structure having a high execution efficiency. Details thereabout will be described later.

A storage allocating part 6 allocates areas necessary to execute the object program, and a register allocating part 7 allocates the general-purpose registers and the floating-point registers. An object program outputting part 8 outputs the object program including strings of machine instructions to a mass storage device 3.

The configuration and the operation of the intermediate language optimizing part 5 will be next described.

A control flow analyzing part 10 analyzes the flow of control in the intermediate language expression to detect the control structure and loops.

A data flow analyzing part 20 analyzes the reference relationships of the definitions of variables. Namely, by use of the results from the control flow analysis, the data flow is analyzed to determine whether or not a value (definition) set to a variable is to be passed to a citation (reference) of the variable at other location.

A loop analyzing part 30 effects an analysis by use of the results from the data flow analyzing part 20 on each loop detected by the control flow analyzing part 10. For each loop, the loop analyzing part 30 generates a list of the following two kinds of variables.

(1) Loop invariant variable

A variable of which the value is unchanged regardless of the loop iteration count.

(2) Inductive variable

A variable of which the value is regularly varied depending on the loop iteration count, namely, the value for each iteration is represented by $C_3*$ (iteration count)$+C_4$, where $C_3$ and $C_4$ must be constants or loop invariant variables.

An inductive control expanding part 40 to which the present invention is applied achieves a loop structure conversion to detect and to resolve the inductive control expressions by use of the results from the loop analyzing part 30. Details of this operation will be described later.

A redundancy removing part 50 is used to effect the other optimization.

Excepting the inductive control expanding part 40, the configuration and the operation of the compiler have been commonly known, and hence the detailed description thereof will be omitted.

Figure 1:
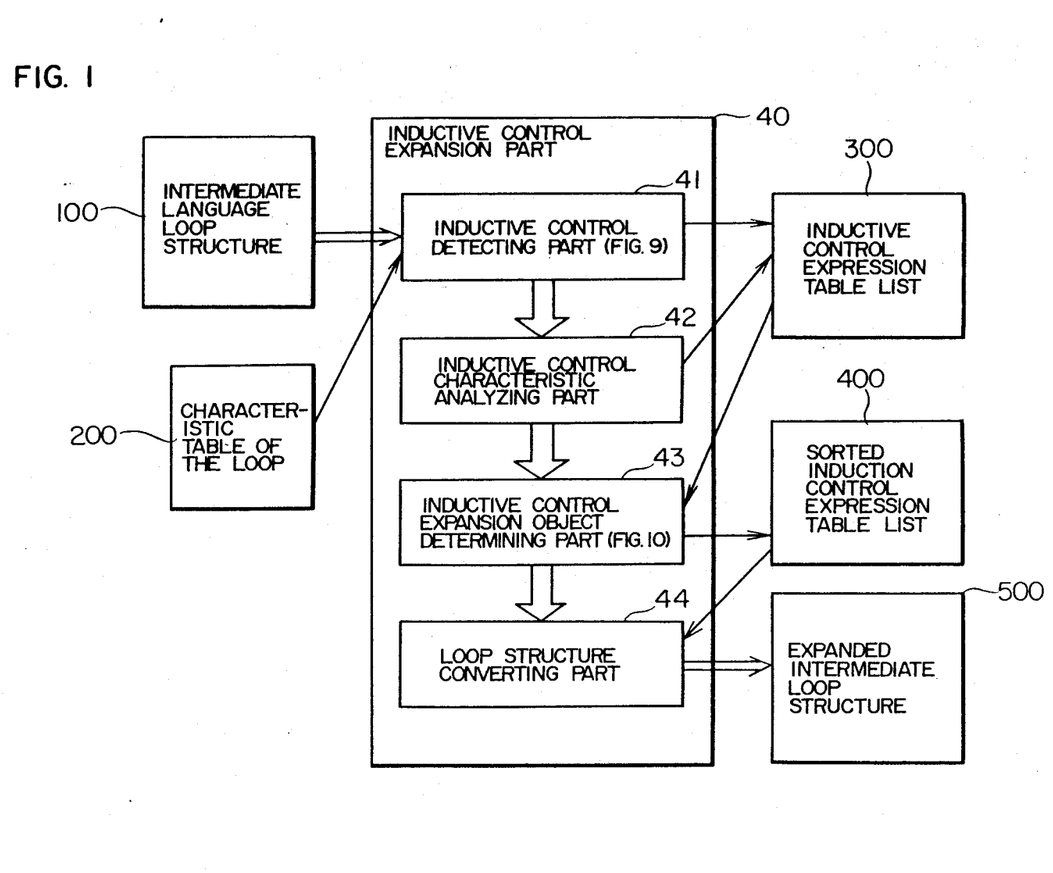
FIG. 1 is a schematic configuration diagram illustrating an inductive control expanding part of an embodiment according to the present invention.
Figure 5:
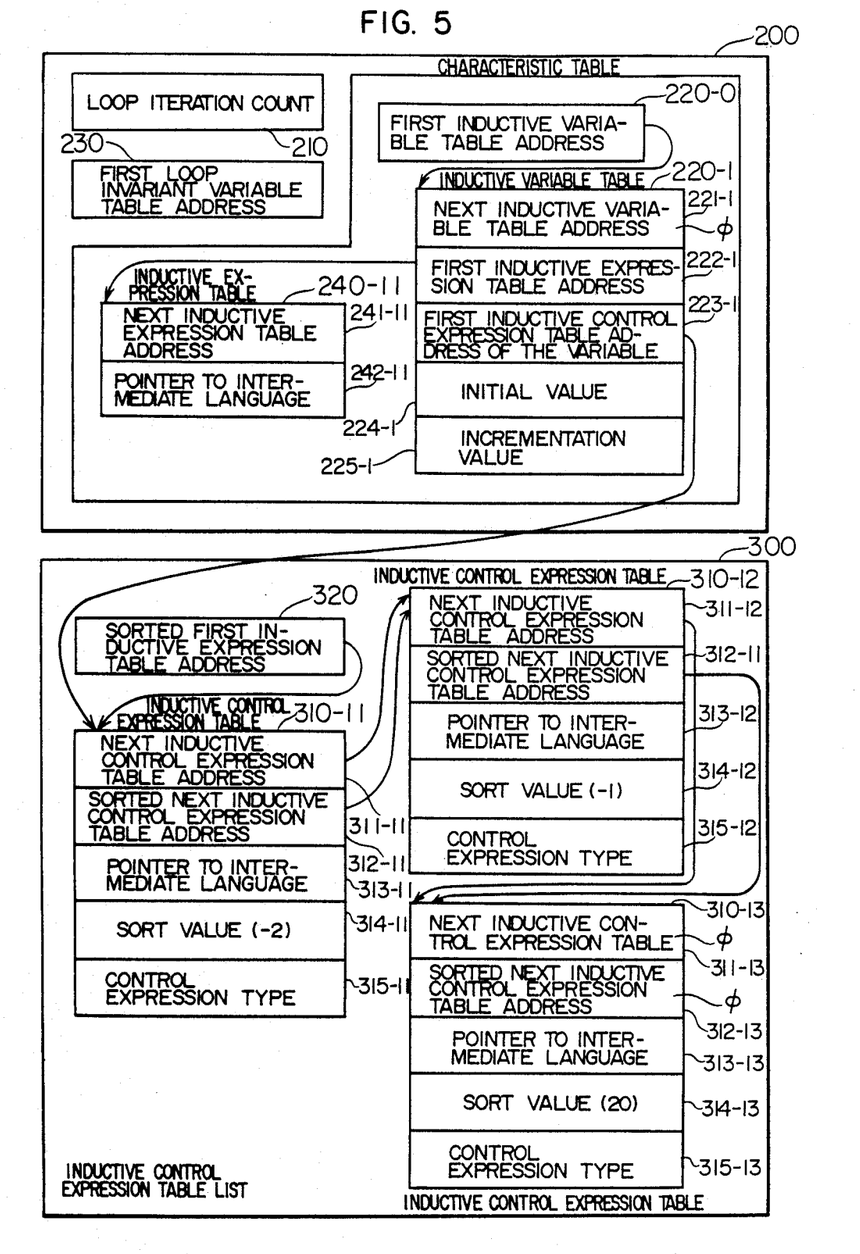
FIG. 5 is a schematic diagram showing the data structures necessary for the operation of FIG. 1.

Referring now to FIGS. 1 and 5, a description will be given of the operation of the inductive control expanding part 40 to which the present invention is applied.

In FIG. 1, an inductive control detecting part 41 receives as inputs thereto an intermediate language loop structure 100 and a characteristic table 200 of the loop generated by the loop analyzing part 30 of FIG. 3 and generates an inductive control expression table list 300. The configuration of the characteristic table 200 of the loop comprises the following three components as shown in FIG. 5.

(1) Loop iteration count 210

(2) Inductive variable table list 220

A list including a first inductive variable table address 220-0 to which inductive variable tables 220-i ($i=1, 2, \ldots$) are connected.

The inductive variable table 220-i includes the following fields.

(a) Next inductive variable table address 221-i

An address indicating the next inductive variable table 220-i+1; $\phi$ for the final table.

(b) First inductive expression table address of the variable

An address indicating the first address of the inductive expression table associated with the inductive variable. This field is set by the loop analyzing part 30. An inductive expression table 240-ij ($j=1, 2, \ldots$) indicated by this field comprises the following fields.

(i) Next inductive expression table address 241-ij

An address indicating the next inductive expression table 241-i(j+1).

(ii) Intermediate language address 242-ij

An address indicating an intermediate language expression in which the inductive expression is included.

(c) First inductive control expression table address of the variable 223-i

An address indicating the first address of the inductive control expression table associated with the inductive variable. This field is set by the inductive control detecting part 41.

(d) Initial value 224-i

A value of the inductive variable when the loop is started.

(e) Incrementation value 225-i

A value to be added to the inductive variable for each iteration of the loop. This may be a negative value.

(3) Loop invariant variable table list

A list including the first loop invariant variable table address 230 and loop invariant variable tables (not shown).

Figure 4:
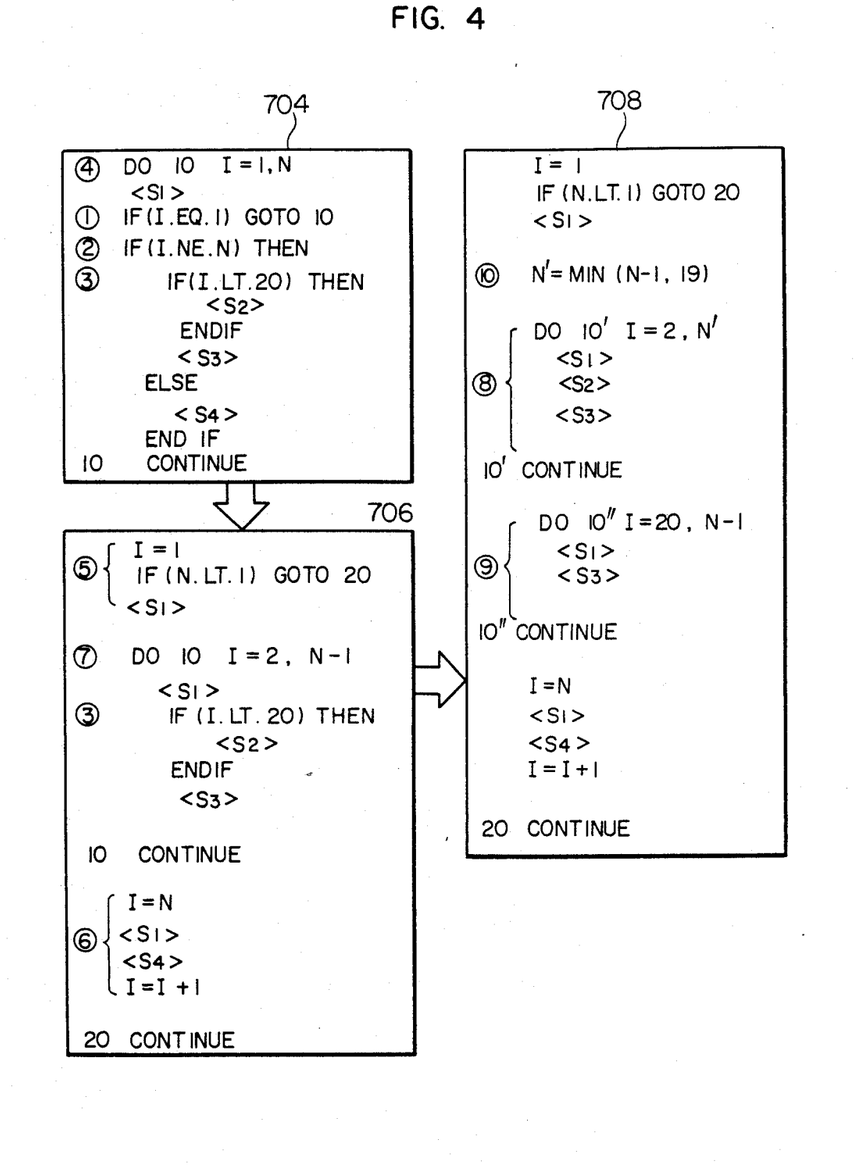
FIG. 4 is an explanatory diagram illustrating the content of the operation of the inductive control expanding part to which the present invention is applied.

The inductive control expression table list 300 comprises two components as shown in FIG. 5, which is illustrated as an example associated with the source program 704 of FIG. 4.

(1) Inductive control expression table 310-ij ($i=1, 2, \ldots i, j=1, 2, \ldots$)

This table is generated for each inductive variable table 220-i corresponding to the inductive control expression.

The inductive control expression table 310-ij includes the following fields.

(a) Next control expression table address 311-ij

An address indicating the next inductive control expression table 310-kl. If the next table is absent, $\phi$ is specified.

(b) Sorted next control expression table address 312-ij

This address is set after the sorting is completed and indicates the next inductive control expression table 310-mn in the sorting order. For the final item, $\phi$ is specified.

(c) Pointer to intermediate language 313-ij

This indicates a location for storing the intermediate language expression of the inductive control expression.

(d) Sort value 314-ij

This value is used as a sorting key. Details will be described later.

(e) Control expression type 315-ij

This indicates the type of the control expression. Details will be described later.

(2) Sorted first control expression table address 320

This field is used to store the address of the first inductive control expression table sorted according to the sort value in the inductive control expression table 310-ij. (The sorting will be described later.)

The inductive control detecting part 41 analyzes the intermediate language loop structure 100 to detect the inductive control expressions included therein and generates an inductive control expression table 310-ij corresponding to each detected inductive control expression. For example, in a case of the program 704 of FIG. 4, the three expressions ①, ② and ③ are detected as the inductive control expressions.

Figure 9:
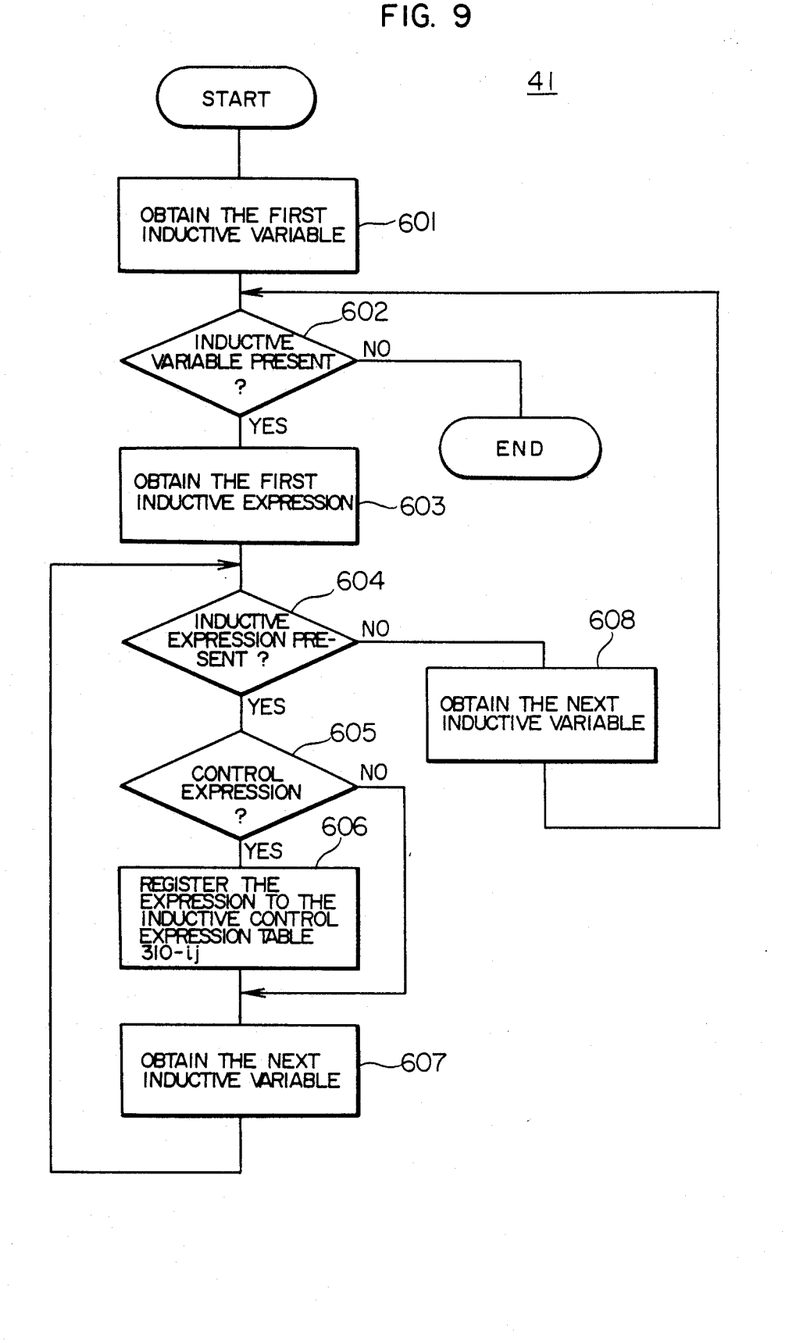
FIG. 9 is a flowchart illustrating an inductive control detecting part.

FIG. 9 shows the processing flow of the inductive control detecting part, which operates as follows.

(1) Step 601

Obtains the content (inductive variable table address) of the first inductive variable table address 220-0 associated with the loop.

(2) Step 602

Ends the processing if the inductive variable table address is $\phi$.

(3) Step 603

Obtains the first inductive expression table address 222-i from the inductive variable table 221-i indicated by the inductive variable table address.

(4) Steps 604 and 608

If the content is $\phi$, in order to check the next inductive variable, the next inductive variable table address 221-i is obtained from the inductive variable table 220-i and control is passed to the step 602 of the processing (2) above.

(5) Step 605

An intermediate language expression is obtained from the intermediate language address field 242-ij of the inductive expression table 240-ij to check whether or not the expression is an expression (a control expression) in a control expression.

If the expression is not a control expression, no action is taken and control is passed to the processing (7).

(6) Step 606

If the control expression is detected, an inductive control expression table 310-ij is generated and is registered to the inductive control expression table list 300, and then control proceeds to the next step.

(7) Step 608

The next inductive expression table address 241-ij is obtained from the inductive expression table 200-ij and control proceeds to the processing (4).

Next, the inductive control characteristic analyzing part 42 effects an analysis of characteristics of each detected inductive expression and sets the characteristic values to the inductive control expression table 310-ij. Namely, the following two information items are set.

Figure 6:
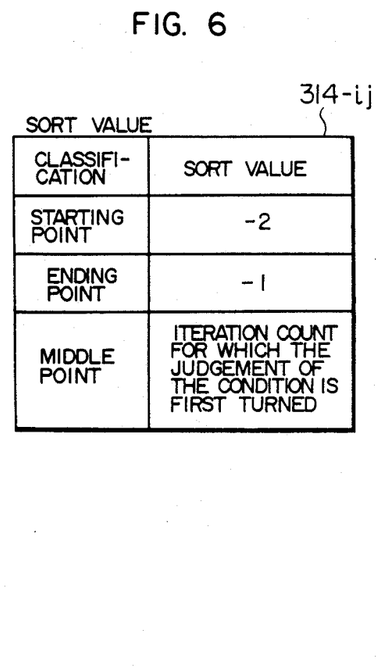
FIG. 6 is an explanatory diagram illustrating sort values in the inductive control table shown in FIG. 5.

(1) Sort value 314-ij (FIG. 6)

This value is used to sort the inductive control expression tables 310-ij and is calculated as follows.

(a) −2 for a starting-point control expression (b) −1 for an ending-point control expression (c) The iteration count for a middle-point control expression, the iteration count being obtained when the judged result of the inductive control expression is first turned or inverted. The values −2 and −1 are set for the starting point and the ending point, respectively, so that the control expressions associated with the starting point and the ending points are sorted to be expanded in this sorting order in the loop structure converting part 44, which will be described later.

Figure 7:
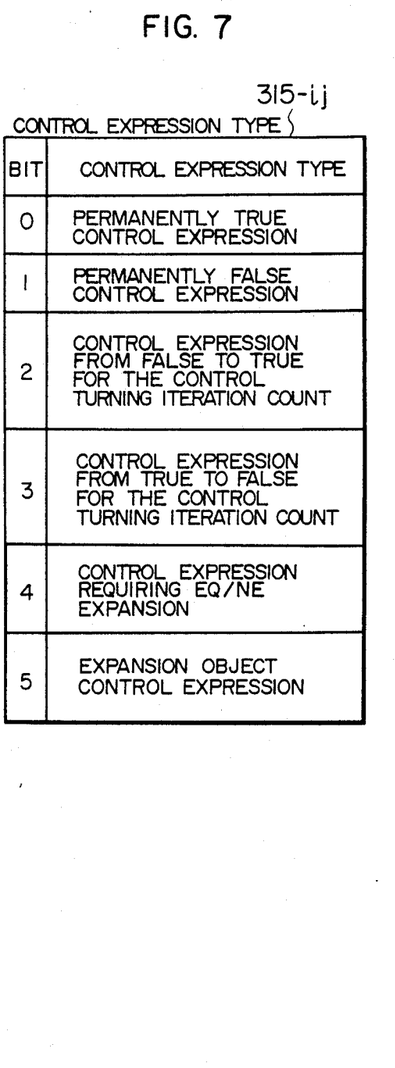
FIG. 7 is a schematic diagram illustrating control expression types in the inductive control table shown in FIG. 5.

(2) Control expression type 315-ij (FIG. 7)

This represents the type of the pertinent inductive control expression as follows.

(a) Permanently true inductive control expression

There may exist a control expression for which the condition is always satisfied within the range of the value of the inductive variable. For example, a control expression IF (I. GE. 1) is always true when the initial value is 1 for the inductive variable I and the incrementation value is positive.

(b) Permanently false inductive control expression

A control expression for which the condition is always unsatisfied within the range of the value of the inductive variable. For example, a control expression IF (I. LT. 1) is always false when the initial value is 1 for the inductive variable I and the incrementation value is positive.

(c) Inductive control expression for THEN turning

An inductive expression for which the judged result of the inductive control expression is changed from false to true. For example, a control expression IF (I. GE. 10) is changed from false to true at a point of the iteration count=10.

(d) Inductive control expression for ELSE turning

An inductive control expression for which the judged result of the inductive control expression is changed from true to false.

(e) Control expression requiring EQ/NE expansion

A control expression for which the judged result of the inductive control expression changes from false to true (or from true to false) for an iteration count and the result changes again from true to false (or from false to true) at the next iteration. For example, a control expression IF (I. EQ. 10) develops this change.

Next, the operation of the inductive control expansion object determining part 43 will be described. This part 43 receives as an input thereto the inductive control expression table list 300 to which the characteristic values have been set and sorts the items in the ascending order of the sort value of each inductive control expression table 310-ij to generate the sorted inductive control expression table list 400. The top position of the sorted inductive control tables 310-ij is set to the first sorted control expression table address 320.

Figure 10:
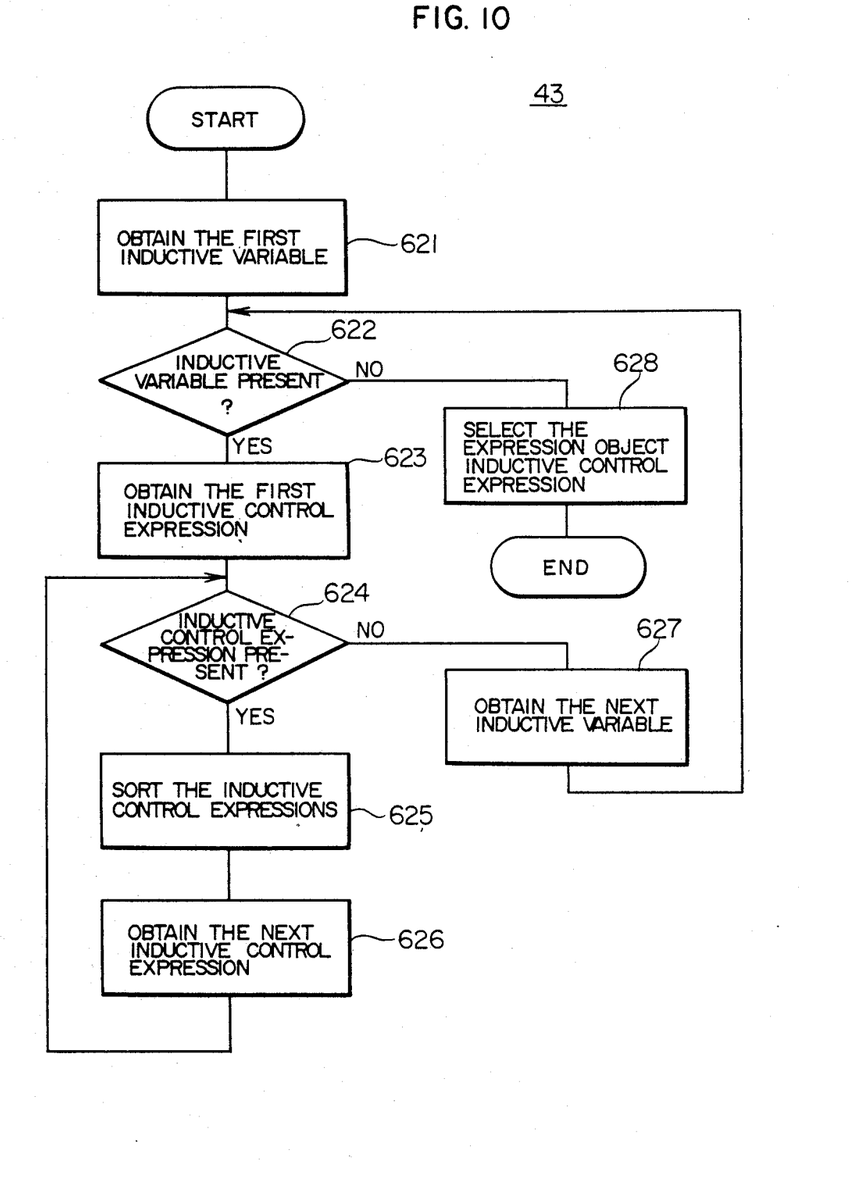
FIG. 10 is a flowchart illustrating the processing of a part for determining the object of the inductive control expansion.

The processing flow thereof will be described with reference to FIG. 10.

(1) Step 621

Obtain the first inductive variable table address 220-0 of the loop.

(2) Step 622

Check to determine whether or not an inductive variable table 220-i is present. If absent, control proceeds to the processing (7).

(3) Step 623

If the inductive variable table 220-i is present, obtain the first inductive control expression table address 223-i therefrom.

(4) Steps 624 and 627

Check to determine whether or not an inductive control expression table 310-ij is present. If absent, in order to check for the next inductive variable, the next inductive variable table address 221-i is obtained and control is passed to the processing (2).

(5) Step 625

If the inductive control expression table 310-ij is present, register this table 310-ij to the sort chain beginning from the sorted inductive control expression table address 320. The value used for the sorting is the sort value 314-ij set by the inductive control characteristic analyzing part 42, and the sorting is accomplished in the ascending order of the sort values.

(6) Step 626

After the sorting is finished, the next inductive control expression table address 311-ij is obtained and then the processing (4) is executed.

(7) Step 628

Determine an expansion object in the sorted induction control expression table list 400 and set the expansion object control flag in the control expression type 315-ij (FIG. 7).

(a) The starting-point control expression and the ending-point control expression are expanded in any cases.

(b) Among the middle-point control expressions, those expressions each having the same value are first selected. These expressions with the duplicated sort value are counted as 1, and if the number of such expressions exceeds a predetermined value, the selection of the expansion object is stopped. The predetermined value is determined according to the magnitude allowed when the object program size is increased due to an expansion of the inductive control expression. Ordinarily, the predetermined value ranging from 2 to 4 is preferably selected.

Finally, an operation of the loop structure converting part 44 will be described. This part 44 receives as an input thereto the sorted inductive control expression table list 400 and outputs an expanded intermediate language loop structure 500. The operation will be described with reference to an example of the loop structure of FIG. 4. As described above, this loop includes the following three kinds of inductive control expressions ①, ②, and ③.

1 Starting-point inductive control expression
2 Ending-point inductive control expression
3 Middle-point inductive control expression The induction control expression tables corresponding to these inductive control expressions ①, ②, and ③ are sorted to be arranged in the sequence thereof and hence are expanded in this order.

(1) Loop expansion of starting-point inductive control expression

The starting-point inductive control expression ① is true only at the starting point and is false for the subsequent iterations. Consequently, the intermediate language expression ⑤ representing the processing to be executed at the starting point is generated at a location immediately before the loop and the initial value of the control variable of the loop is incremented by one, namely, the value is changed from 1 to 2 as shown in the expression ⑦. Thereafter, the inductive control expression 1 is erased from the loop body.

(2) Loop expansion of ending-point inductive control expression ②

The ending-point inductive control expression 1 is true up to the ending point, namely, this expression 1 is false only at the ending point. Consequently, the intermediate language expression ⑥ representing the processing to be executed at the ending point is generated at a location following the loop and the final value of the control variable of the loop is decremented by one, namely, the value is changed from N to N−1. Thereafter, the inductive control expression ② and the part $<S_4>$ to be executed only at the ending point are erased from the loop body.

After the operations (1) and (2) above are completed, the program 704 is converted into the program 706.

(3) Loop expansion of middle-point inductive control expression ③

The inductive control expression ③ is true up to the iteration count of 19 and is false beginning from the iteration count of 20. Therefore, the loop is divided into two loops. Namely, up to the iteration count of 19, a loop ⑧ including the THEN-part $<S_2>$ of the control expression ③ is formed; and for the iteration count 20 and subsequent iteration counts, a loop ⑨ including the ELSE-part (empty in this example) of the control expression ③ is established. In this example, since the final value N−1 of the loop iteration is represented by a variable, the middle point (19) may be located at a point succeeding the final value (N−1). To prevent such a case, the expression ⑩ is inserted to guarantee the appropriate operation regardless of the final value.

As described above, the program 704 is converted into the program 708 of FIG. 4. As a result, the inductive control statement in the loop is resolved.

Figure 8:
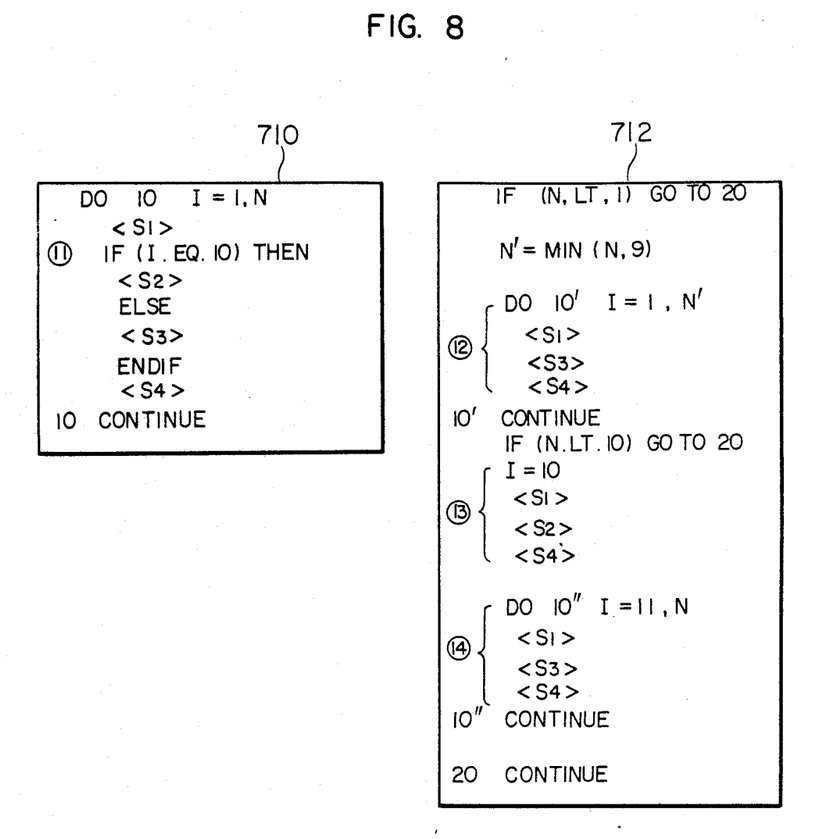
FIG. 8 is a diagram for explaining the loop structure conversion for a relative operator EQ/NE.

If the middle-point inductive control expression is an EQ/NE expansion control expression (FIG. 7), the expansion is achieved to convert the program 710 into the program 712 as shown in FIG. 8. Namely, if the control expression ⑪ of the program 710 is a control expression having an EQ/NE expansion condition, the expansion is accomplished in the case to form three parts including a loop ( ⑫ ) representing the part preceding the middle point (10), a part ( ⑬ ) representing the content of execution at the middle point (10), and a loop (⑭ ) representing the processing after the middle point (10).

An embodiment has been described. According to the embodiment, three kinds of inductive control statements, namely, the starting-point inductive control expression, the ending-point inductive control expression, and the middle-point control expression are systematically registered to the inductive control expression table list 300. The expansion object can be selected from the inductive control expressions registered to the list 300 beginning from the most important item and hence the resolution of the control expression can be effected according to the importance of the inductive control expression. As a result, an effective object program can be generated.

Although a compiler generating an object program has been described in this embodiment, the present invention can be easily applied to a precompiler and an interpreter on analogy thereto.

According to the present invention, an inductive control expression is detected in a loop and a loop expansion is achieved according to the characteristic of the inductive control expression, and hence the inductive control expression is resolved, which leads to an effect that the execution efficiency of an object program is improved.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A method executed by a machine for inverting a source program having a first loop including a plurality of statements which are written in a high level language and are repetitiously executed into an object program for a digital computer comprising the following steps of:

(a) detecting from said statements of said first loop of said source program a control statement (an inductive control statement) having a control expression specifying variables constituted from a linear function $C_1 n + C_2$ of a loop iteration count n, said variables being to be judged for a branch, where $C_1$ and $C_2$ are constants, loop invariant variables, or functions thereof;

(b) detecting based on said control expression a turning form indicating whether a change of a turning number representing a loop iteration count for which a variable of said control expression of said detected control statement and a change of a value of said control expression indicates changes from values for a successful branch to values for an unsuccessful branch or vice versa and a turning point type indicating whether said turning number is an initial iteration count, a final iteration count, or an intermediate iteration count of said first loop;

(c) generating a string of statements having a loop not including said control statement and generating an execution result identical to an execution result of said first loop based on said first loop and said turning number, said turning form, and said turning point type detected on said control statement; and (d) converting said generated string of statements into an object code.

2. A method according to claim 1, wherein said step (c) includes the following steps of:

generating a second string of statements from said first loop when a first inductive control statement which turns at a first iteration count or a last iteration count of said first loop and a second inductive control statement which turns at an intermediate iteration count are both detected in said step (a), said second string of statements having a second loop including said second inductive statement and not including said first inductive control statement and bringing forth a result identical to an execution result of said first loop;

generating from said second string of statements a third string of statements which has two third loops not including said first and second inductive control statements and which brings forth an execution result identical to said second string of statements.

3. A method according to claim 1 wherein said step (c) includes the following steps of:

generating a first string of statements from said first loop when a plurality of inductive control statements each turning at an intermediate iteration count in said first loop are detected in said step (a), said first string of statements having a loop not including an inductive control statement with a minimum turning number;

generating a second string of statements from said first string of statements, said second string of statements not including an inductive control statement with a second minimum turning number; and sequentially generating loops each not including an inductive control statement with a turning number which is next greater than a turning number of an inductive control statement not included in a loop preceding said each loop.

* * * * *